United States Patent [19]
Kazuno

[11] Patent Number: 5,719,887
[45] Date of Patent: Feb. 17, 1998

[54] DATA FAULT PROCESSING APPARATUS AND METHOD THEREFOR

[75] Inventor: Masanori Kazuno, Yamanashi, Japan

[73] Assignee: NEC Corporation, Tokyo, Japan

[21] Appl. No.: 620,568

[22] Filed: Mar. 22, 1996

[30] Foreign Application Priority Data

Mar. 23, 1995 [JP] Japan .................... 7-063840

[51] Int. Cl.⁶ .................................. G06F 11/10
[52] U.S. Cl. ................... 371/40.1; 395/182.04; 395/185.05
[58] Field of Search ............... 371/40.1; 395/182.04, 395/185.05

[56] References Cited

U.S. PATENT DOCUMENTS

| | | | |
|---|---|---|---|
| 4,296,494 | 10/1981 | Ishikawa et al. | 395/182.04 |
| 4,388,684 | 6/1983 | Nibby, Jr. et al. | 395/185.05 |
| 4,458,349 | 7/1984 | Aichelmann, Jr. et al. | 395/182.04 |
| 5,155,843 | 10/1992 | Stamm et al. | 395/182.03 |
| 5,274,646 | 12/1993 | Brey et al. | 371/40.1 |

*Primary Examiner*—Stephen M. Baker
*Attorney, Agent, or Firm*—Whitham, Curtis, Whitham & McGinn

[57] ABSTRACT

A data fault processing apparatus is provided in a multi-processor system having a plurality of main memories, and a plurality of cache memories. If a syndrome based on data and an error correction code (ECC) has an uncorrectable pattern, the ECC is converted so that a syndrome based on the data and the converted ECC has a check suppressing pattern. When an error detector detects an error from the syndrome, if the syndrome has the check suppressing pattern, a fault is not notified to the processors.

25 Claims, 11 Drawing Sheets

| SYNDROME | CHECK SUPPRESSING PATTERN | DATA (4B) | | | | | | | | | | | | | | | | | | | | | | | | | | | | | | | ECC | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| | | (0) | (1) | (2) | (3) | (4) | (5) | (6) | (7) | (8) | (9) | (10) | (11) | (12) | (13) | (14) | (15) | (16) | (17) | (18) | (19) | (20) | (21) | (22) | (23) | (24) | (25) | (26) | (27) | (28) | (29) | (30) | (31) | (0) | (1) | (2) | (3) | (4) | (5) | (6) |
| (0) | 1 | 1 | 1 | 1 | 1 | 1 | 1 | 1 | 1 | | | | | | | | | | | | | | | | | | | | | | | | | 1 | | | | | | |
| (1) | 1 | 1 | 1 | 1 | 1 | | | | | 1 | 1 | 1 | 1 | | | | | | | | | | | | | | | | | | | | | | 1 | | | | | |
| (2) | 1 | | | | | 1 | 1 | 1 | 1 | 1 | 1 | 1 | 1 | | | | | 1 | 1 | 1 | 1 | | | | | | | | | | | | | | | 1 | | | | |
| (3) | 1 | | | 1 | | | | 1 | | | | 1 | | 1 | 1 | 1 | 1 | | | | | 1 | 1 | 1 | 1 | | | | | 1 | 1 | 1 | 1 | | | | 1 | | | |
| (4) | 1 | | 1 | | | | 1 | | | | 1 | | | 1 | 1 | | | 1 | 1 | | | 1 | 1 | | | 1 | 1 | 1 | 1 | | | | | | | | | 1 | | |
| (5) | 1 | 1 | | | | 1 | | | | 1 | | | | 1 | | 1 | | 1 | | 1 | | 1 | | 1 | | 1 | 1 | | | 1 | 1 | | | | | | | | 1 | |
| (6) | 1 | | | | 1 | | | | 1 | | | | 1 | | 1 | | 1 | | 1 | | 1 | | 1 | | 1 | | | 1 | 1 | | | 1 | 1 | | | | | | | 1 |

← CORRECTABLE PATTERN →

FIG. 4

| | NUMBER OF "1" IN SYNDROME | REMARKS | FAULT NOTIFICATION | ERROR NOTIFICATION |
|---|---|---|---|---|
| NO ERROR | 0 | — | NO | NO |
| 1-BIT ERROR (DATA) | 3 | CORRECTABLE PATTERN | YES | NO |
| 1-BIT ERROR (ECC) | 1 | CORRECTABLE PATTERN | YES | NO |
| 2-BIT ERROR | 2, 4, 6 | UNCORRECTABLE PATTERN | YES | YES |
| CHECK SUPPRESSING PATTERN | 7 (ALL "1") | — | NO | YES |

FIG.5

DATA FAULT PROCESSING APPARATUS AND METHOD THEREFOR

BACKGROUND OF THE INVENTION

The present invention relates to a data fault processing apparatus, and more particularly to a data fault processing apparatus in a multi-processor system with error detection and correction functions performed by error correction codes (ECC).

In a conventional data fault processing apparatus, error detection and error correction by ECC are carried out so as to detect and correct data errors occurring in main memories, cache memories, and system buses for connecting these memories together. When uncorrectable errors occur, the errors are detected and notification thereof is issued to processors.

Referring to FIG. 1, a multi-processor system having a data fault processing apparatus with error detection and correction functions by ECC has main memories 10, cache memories 15, system buses connected between the main memories 10 and the cache memories 15, and processors 20 connected to the cache memories 15. The system buses have a bus for data 31 and a bus for ECC 32.

Referring to FIG. 2, the main memory 20 has a RAM (random access memory array) 101, a corrector 103 for correcting data and ECC of the RAM 101, another corrector 102 for correcting data and ECC of the system buses, an error detector 105 for detecting errors contained in the data and the ECC of the RAM 101, and an error detector 104 for detecting errors contained in the data and the ECC of the system buses.

Referring to FIG. 3, the cache memory 15 has a RAM 151, a corrector 153 for correcting data and ECC of the RAM 151, and another corrector 152 for correcting data and ECC of the system buses. The cache memory 15 further has an error detector 154 for detecting errors contained in the data and ECC of the RAM 151, another error detector 155 for detecting errors contained in the data and ECC of the system buses, comparators 156, 157 for judging whether or not a syndrome during error detection is coincident with an uncorrectable pattern, and also an error replier 164 for notifying a requesting processor of an error when the syndrome is coincident with the uncorrectable pattern.

Referring to FIG. 4, a code diagram of a 1-bit error correction and a 2-bit error detection is used for generating the syndromes with respect to 4-byte (32 bits) data.

The ECC, as shown in FIG. 4, is generated by exclusively OR-gating bits of data indicated by "1". For instance, an ECC bit (0) is generated from a calculation result of exclusively OR-gating bits (0) to (13) of the data. An ECC bit (1) is generated by exclusively OR-gating bits (0) to (3) and (14) to (23) of the data.

The syndrome is generated by exclusively OR-gating a bit of data indicated by "1" with a bit of ECC indicated by "1". For example, a bit (0) of the syndrome is generated by exclusively OR-gating bits (0) to (13) of the data with bit (0) of the ECC, whereas a bit (1) of the syndrome is generated by exclusively OR-gating bits (0) to (3) and (14) to (23) of the data with a bit (1) of the ECC.

Based upon the bit values (0) to (6) of the syndrome generated in accordance with FIG. 4, the error correction, the fault notification, and the error notification to the requesting processor are executed in accordance with a syndrome judging chart shown in FIG. 5. When no error occurs, any one of the bit values (0) to (6) of the syndrome becomes "0". In this case, no execution is made of the error correction, the fault notification, and the error notification to the requesting processor.

When a 1-bit error occurs, the bit values (0) to (6) of the syndrome are corresponded to any one of the correctable patterns represented in FIG. 4. For instance, when the bit values (0) to (6) of the syndrome are "1101000", it can be judged that the bit value (0) of the data contains an error.

When the bit values (0) to (6) of the syndrome are "1000000", it can be judged that the bit value (0) of the ECC contains an error. In this case, the corrected data and the corrected ECC can be obtained by inverting either the bit value (0) of the data, or the bit value (0) of the ECC. These producing, decoding and correcting operations of the syndrome are executed by the respective correctors 102, 103, 152, and 153 shown in FIGS. 2 and 3.

In the case of a 1-bit error, as represented in FIG. 5, although fault notification occurs, since the corrected data produced after the correction is supplied to the requesting processor, no error notification is made.

When a 2-bit error occurs, neither the data, nor the ECC can be corrected as shown by the "Uncorrectable Pattern" status in the "Remarks" column of FIG. 5. However, the error is detected. In this case, the correctable patterns of FIG. 4 are set in order such that a bit number when the values (0) to (6) of the syndrome become "1" may be any one of 2, 4 and 6. When the 2-bit error occurs, notification of the fault occurs, and since incorrect data which is uncorrectable is outputted to the requesting processor, the uncorrectable error is detected by the comparators 156 and 157 shown in FIG. 3, and the error repliers 164 and 165 notify the requesting processor of the error.

All of the above-described error detections and fault notifying operations are executed by the error detectors 104, 105, 154, and 155 of FIGS. 2 and 3.

Next, the operations of the respective processors issuing memory read requests will be described referring to FIGS. 1–3.

First, the memory read requests issued from the respective processors 20 are processed by the cache memory 15 to thereby access the RAM 151, as shown in FIG. 3. When the objective read data is located in the RAM 151, the read data is returned to the requesting processor 20. At this time, the error correction by the corrector 153 and also the error detection by the error detector 155 are carried out with respect to the data and the ECC read out from the RAM 151.

When the error is detected, the requesting processor 20 is notified of the fault. When error is correctable, the error is corrected by the corrector 153, and the corrected data is returned to the processor 20. If the comparator 157 judges that the syndrome is coincident with an uncorrectable pattern, then the requesting processor 20 is notified of the fault by the error replier 165 through selector 169.

When the objective read data is not present in the RAM 151, the read operation is performed referring to the main memory 10. In this case, the objective read data is read out from the RAM 101, as shown in FIG. 2. Then, the error correction by the corrector 103 and the error detection by the error detector 105 are carried out with respect to both the data and the ECC. Both the data and the ECC, which have been error-corrected, are respectively transferred via the system buses 31 and 32 to the cache memory 15.

The cache memory 15 receives the data and ECC from the system buses 31 and 32. The data and ECC are corrected by the corrector 152 and error-detected by the error detector 154. The corrected data is returned to the requesting processor 20 via selector 169, and at the same time, is stored in the RAM 151. When the comparator 156 judges that the syndrome is coincident with the uncorrectable pattern, the requesting processor 20 is notified of the error by the error replier 164 via selector 169.

As described above, when the data is read from the main memory 10, the error detection is performed when the data is read out from the RAM 101, and further the error detection is carried out at the time when the data is received from the system bus 31. Therefore, when the correctable error occurs during the reading operation of the RAM 101, since the data corrected by the corrector 103 is outputted to the system bus 31, the error detector 105 provides notification of the fault.

However, when the uncorrectable error occurs during the reading operation of the RAM 101, since the error data is directly outputted to the system bus 31, both the error detector 105 and the error detector 154 provide notification of the fault.

Furthermore, since the data with the uncorrectable error is stored in the RAM 151 shown in FIG. 3, when the same data is read from different processors connected to the same cache memory 15, another error detector 155 again notifies the processor of the fault when the data with the uncorrectable error is read out from the RAM 151.

Indeed, in a store-in cache, since the content of the RAM 151 is written back to the RAM 101, when the uncorrectable data is stored in the RAM 151 in the above-described manner, the error detector 155 provides notification of the fault when the content of the RAM 151 is read in connection with the write-back process of this data into the RAM 101. Moreover, the error detector 104 provides notification of the fault with respect to the data received by the main memory 10 via the system bus 31.

As described above, in the conventional data fault processing apparatus, as to a fault caused by a single factor, the fault notifications occur from plural locations and irrelevant to the time. In addition, the location of the fault cannot be specified based on these plural fault notifications. The reason why the error data is circulated in the conventional data fault processing apparatus is discussed below.

Specifically, when the processor refers to the content of such incorrect data which is uncorrectable, notification of this fault should be reliably provided by the error replier and the like to the requesting processor. If the incorrect data cannot be so notified, then the data is erroneously converted and an incorrect operation is performed. Accordingly, notification of the fault must be reliably and promptly made.

Furthermore, error notification is required until the content of the incorrect data is rewritten into the correct content by the job or process re-executing a process executed in response to the error notification to the processor, and also the fault processing operation executed in response to the fault notification.

When the reading operation of the error data is executed by these fault process operations, since the error is similarly detected to notify the fault, very complex fault processing operations must be performed which determine whether or not the same fault has occurred.

As described above, the conventional apparatuses have such a problem. That is, when the uncorrectable error occurs, even when the fault is caused by a single factor, the fault notification is issued from a plurality of locations. Thus, the fault occurrence location cannot be accurately specified, so that very complex fault processing operations become necessary.

Furthermore, since the faulty device cannot be specified accurately and reliably, the components located in each of the plural locations must be replaced as a precaution.

Also, in the conventional apparatus, fault notification occurs every time the fault occurs so that this error is affirmatively notified to the requesting processor. Therefore, when this fault notification is suppressed or restrained, the error occurrence notification cannot be made notified to the requesting processor.

SUMMARY OF THE INVENTION

In view of the foregoing problems of the conventional system, an object of the present invention is to issue a fault notification once for each error characteristic.

In a data fault processing apparatus according to a first aspect of the present invention, a converter converts an error correction code so that a syndrome generated from a data and the error correction code, becomes a check suppressing pattern when the syndrome has an uncorrectable pattern. A fault notifier notifies a processor of the fault if an error is detected, except when the syndrome has the check suppressing pattern converted by the converter.

With the unique and unobvious structure of the present invention, when the uncorrectable data error occurs, the fault is notified only from the location where the fault is detected first, and the fault notification from a plurality of locations may be suppressed. Thus, the location of the fault can be quickly and reliably pin-pointed.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 4 is a code diagram of a 1-bit error correction and a 2-bit error detection with respect to a 4-byte data;

FIG. 5 is a judgement diagram of a syndrome;

DETAILED DESCRIPTION OF THE PREFERRED EMBODIMENT

A data fault processing apparatus in accordance with a preferred embodiment of the present invention will be described in detail with reference to the accompanying drawings.

Figure 1:
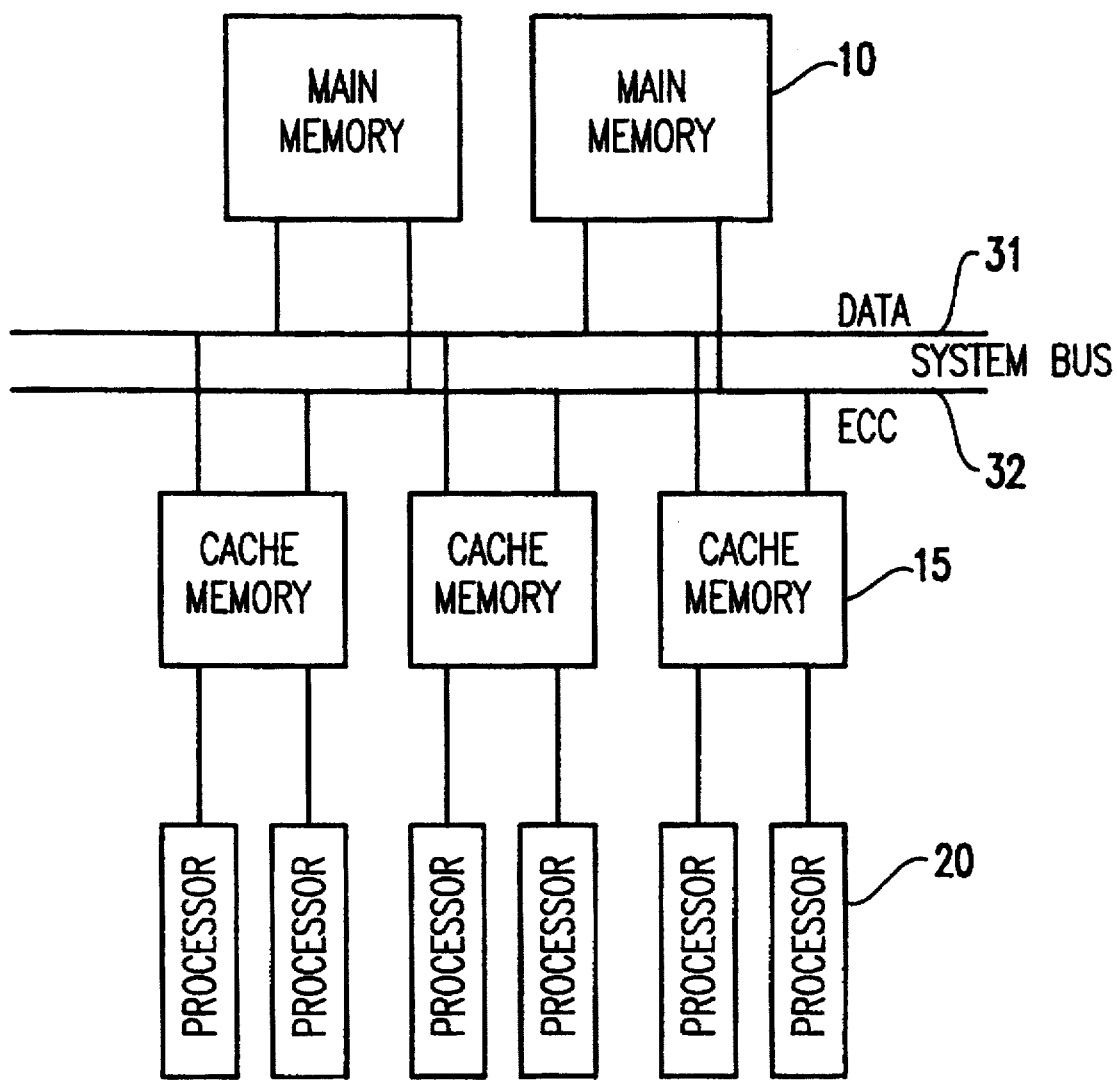
FIG. 1 is a block diagram showing the configuration of a multi-processor system having a data fault processing apparatus according to a preferred embodiment of the present invention.
Figure 2:
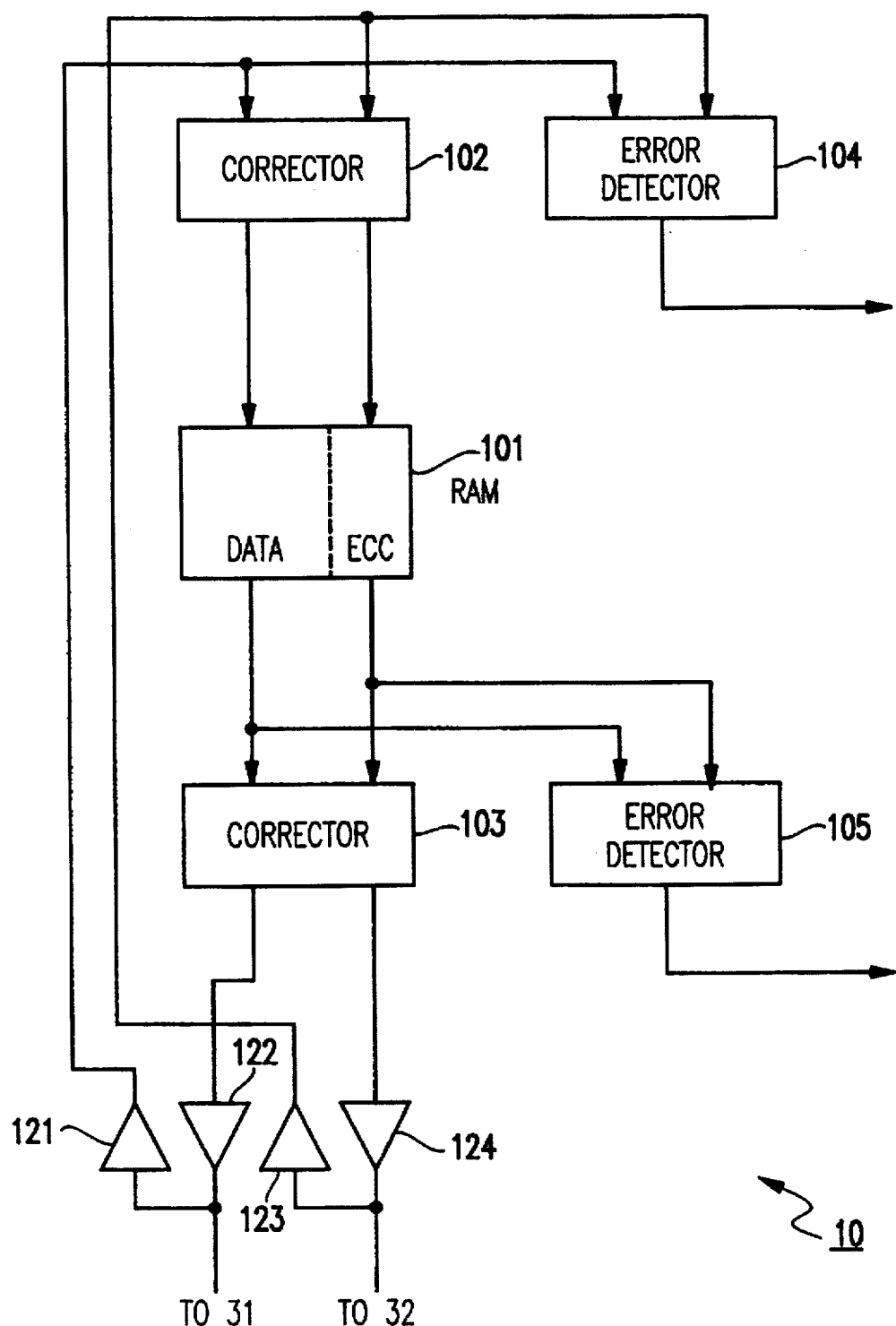
FIG. 2 is a block diagram showing the configuration of a conventional main memory.
Figure 3:
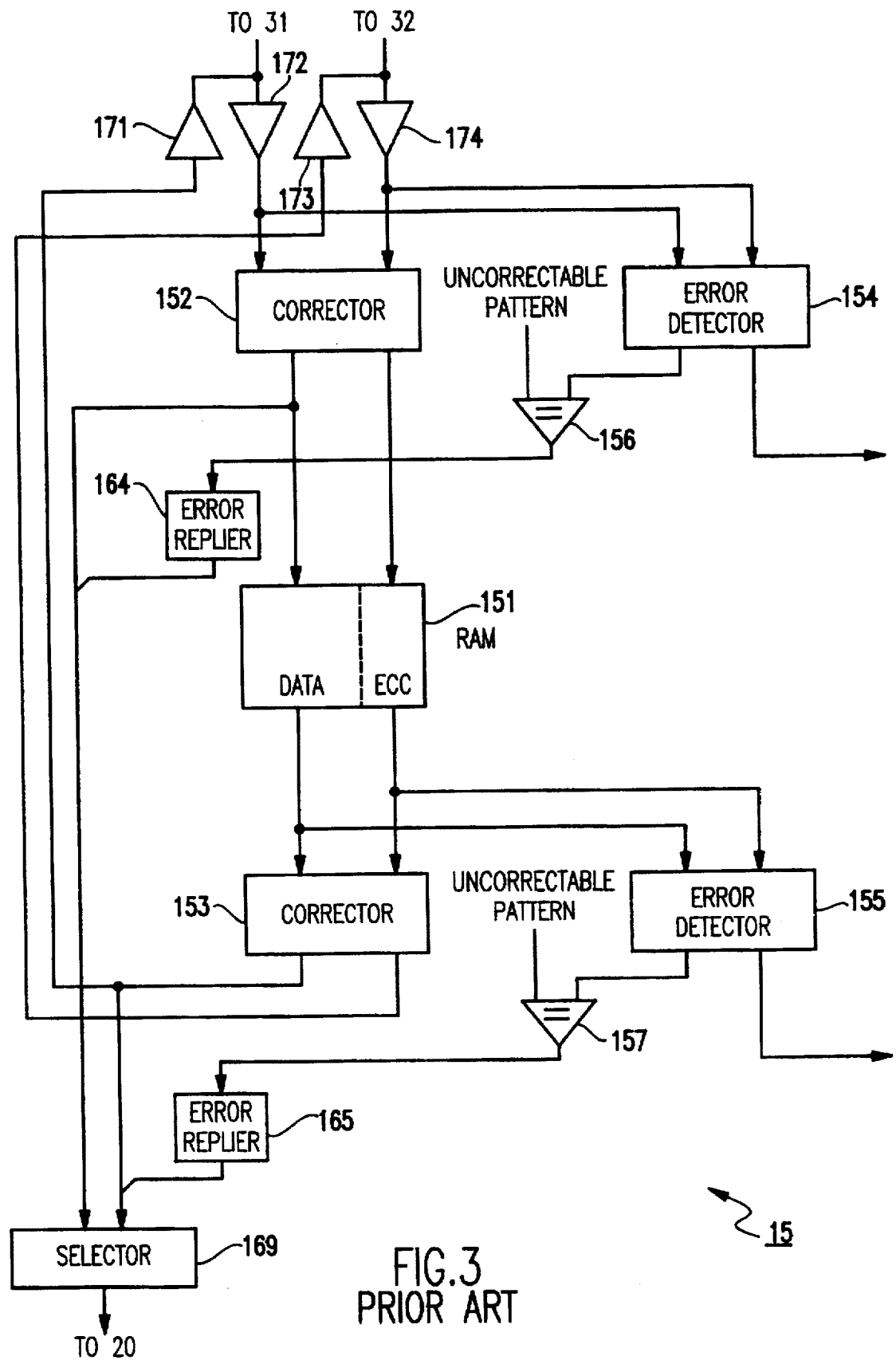
FIG. 3 is a block diagram showing the configuration of a conventional cache memory.

Referring to FIG. 1, a multi-processor system having a data fault processing apparatus according to a preferred embodiment of the present invention has main memories 10, cache memories 15, system buses 31 and 32 connected between the main memories 10 and the cache memories 15, and processors 20 connected to the cache memories 15.

Upon a memory read request, the processor 20 first accesses the cache memory 15, then accesses the main memory 10 if the required data does not exist in the cache memory 15. As is known, access to the cache memory takes only several machine cycles, whereas an access to the main memory 10 may take an order of magnitude or more machine cycles.

Figure 6:
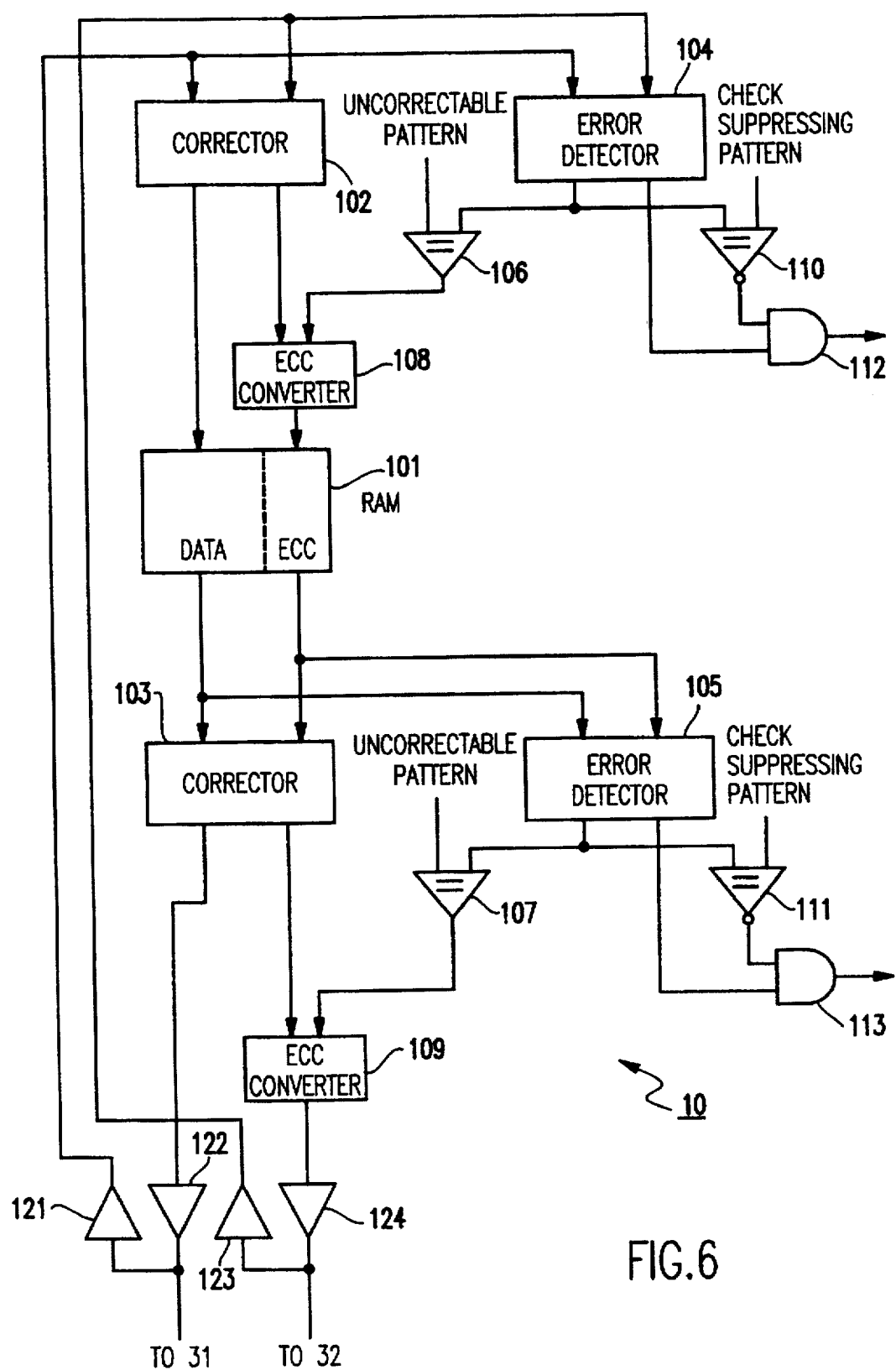
FIG. 6 is a block diagram showing the configuration of a main memory 10 according to a preferred embodiment of the present invention.

Referring to FIG. 6, the main memory 10 has a RAM 101, a corrector 103 and an error detector 105 for data and ECC of the RAM 101, a corrector 102 and an error detector 104 for data and ECC of the system buses 31 and 32, a comparator 110 for judging whether a syndrome, when the error detector 104 detects an error, is coincident with a check suppressing pattern, and another comparator 111 for judging whether a syndrome, when the error detector 105 detects an error, is coincident with the check suppressing pattern.

The main memory 10 further includes AND gates 112 and 113 for providing fault notification at a time other than when the syndrome is coincident with the check suppressing pattern, comparators 106 and 107 for judging whether the above-described syndrome is coincident with an uncorrectable pattern, and ECC converters 108 and 109 for converting the ECC so that the syndrome becomes the check suppressing pattern when the syndrome is coincident with the uncorrectable pattern. The corrector 102 receives the data and ECC from the system buses 31 and 32 via buffers 121 and 123, respectively. The corrector 103 sends the corrected data to the system bus 31 via a buffer 122. The ECC converter sends the converted ECC to the system bus 32 via a buffer 124.

Figure 7:
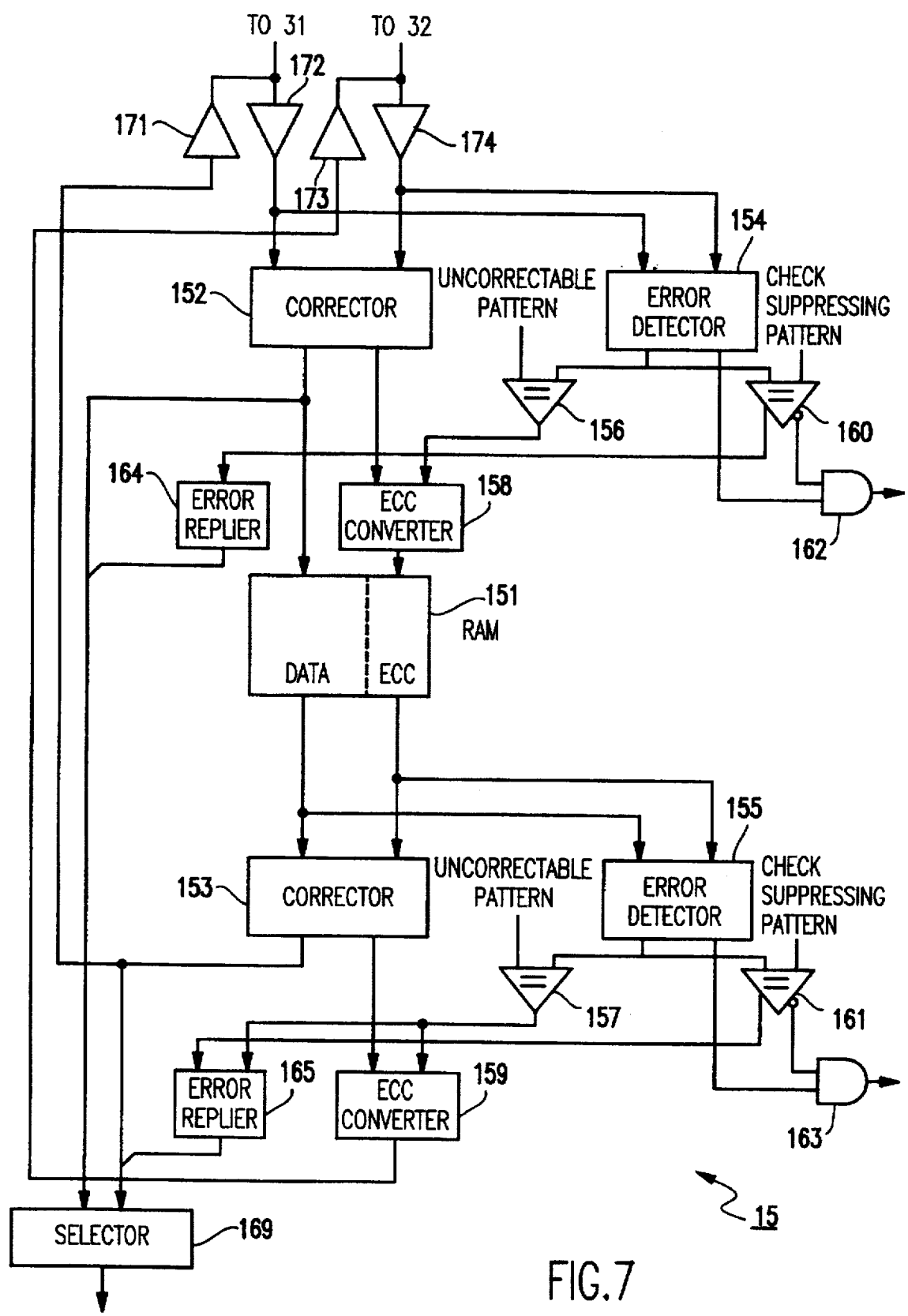
FIG. 7 is a block diagram showing the configuration of a cache memory 15 according to the preferred embodiment of the present invention.

Referring to FIG. 7, the cache memory 15 has a RAM 151, a corrector 152 and an error detector 154 for data and ECC of the system buses 31 and 32, respectively, a corrector 153 and an error detector 155 for data and ECC of the RAM 151, a comparator 156 for judging whether a syndrome, when the error detector 154 detects an error, is coincident with an uncorrectable pattern, and another comparator 157 for judging whether a syndrome, when the error detector 155 detects an error, is coincident with the uncorrectable pattern.

The cache memory 15 further includes comparators 160 and 161 for judging whether a syndrome, when the error detectors 154 and 155 detect the data and ECC of the system buses and of the RAM 151, is coincident with a check suppressing pattern, AND gates 162 and 163 for providing fault notification at a time other than when the syndrome is coincident with the check suppressing pattern, ECC converters 158 and 159 for converting the ECC so that the syndrome becomes the check suppressing pattern when the comparators 156 and 157 detect that the above-described syndrome is coincident with the uncorrectable pattern, and error repliers 164 and 165 for notifying the requesting processor of the error not only when the uncorrectable pattern is coincident with the syndrome, but also when the check suppressing pattern is detected by the comparators 160 and 161.

The cache memory 15 receives data and ECC from the system buses 31 and 32 via buffers 172 and 174, respectively. The corrector 153 sends the corrected data to the system bus 31 via a buffer 171. The ECC converter 159 sends the converted ECC to the system bus 32 via a buffer 173. One of the corrected data from the corrector 152 and 153 is selected by a selector 169.

Figure 8:
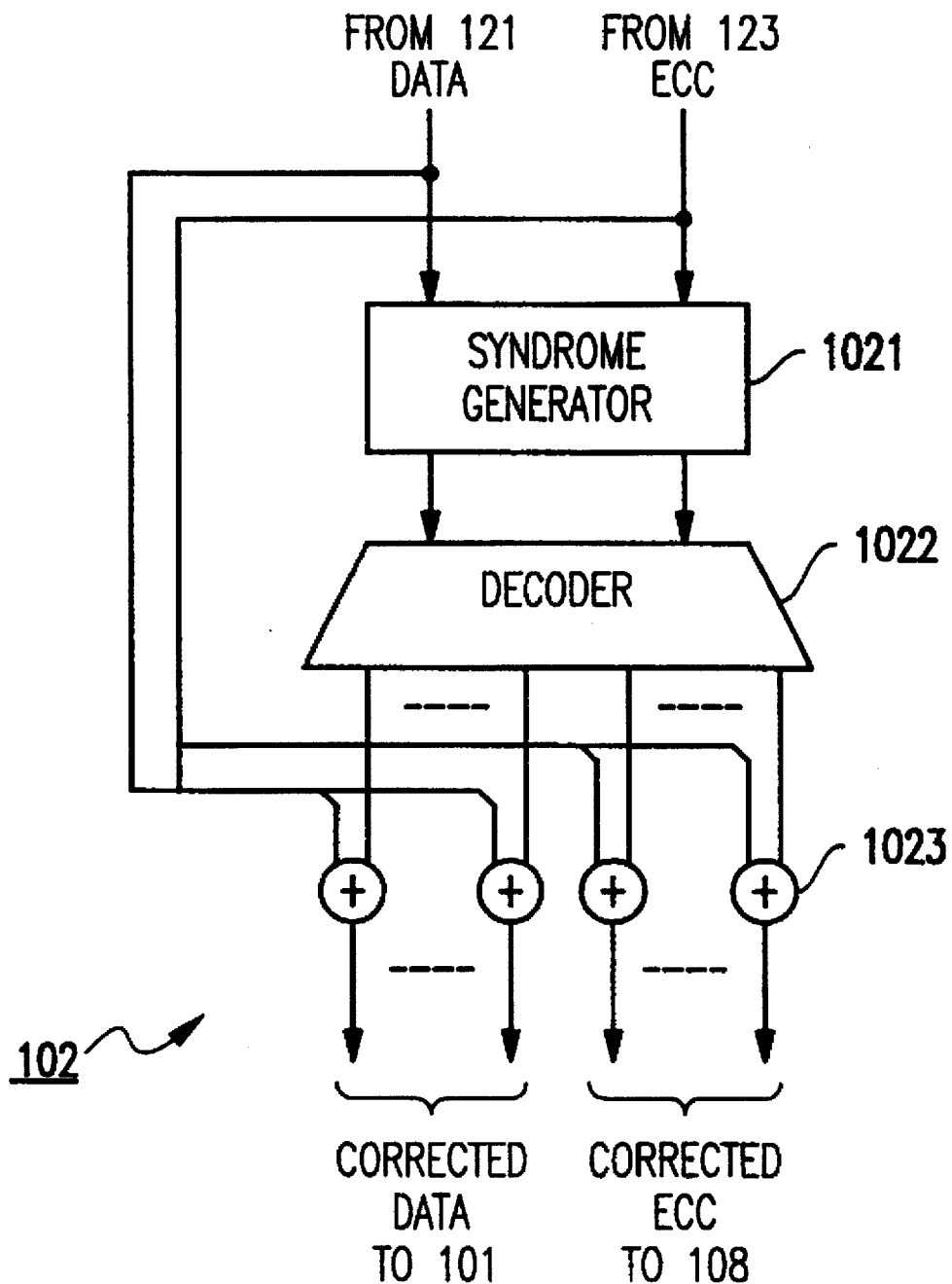
FIG. 8 is a block diagram showing the configuration of a corrector 102 according to the preferred embodiment of the present invention.

Since each of the correctors 102, 103, 152, and 153 has the same circuit arrangement, the detailed circuit arrangement of the corrector 102 will now be described with reference to FIG. 8.

The corrector 102 has a syndrome generator 1021, a decoder 1022, and exclusive-OR gates 1023. The syndrome generator 1021 generates the syndrome according to FIG. 4. The decoder 1022 outputs correction signals based on FIG. 4. For example, if the syndrome is "1101000", the data (0) must be corrected. The exclusive-OR gates 1023 reverse the data and ECC according to corresponding bits of correction signals.

Figure 9:
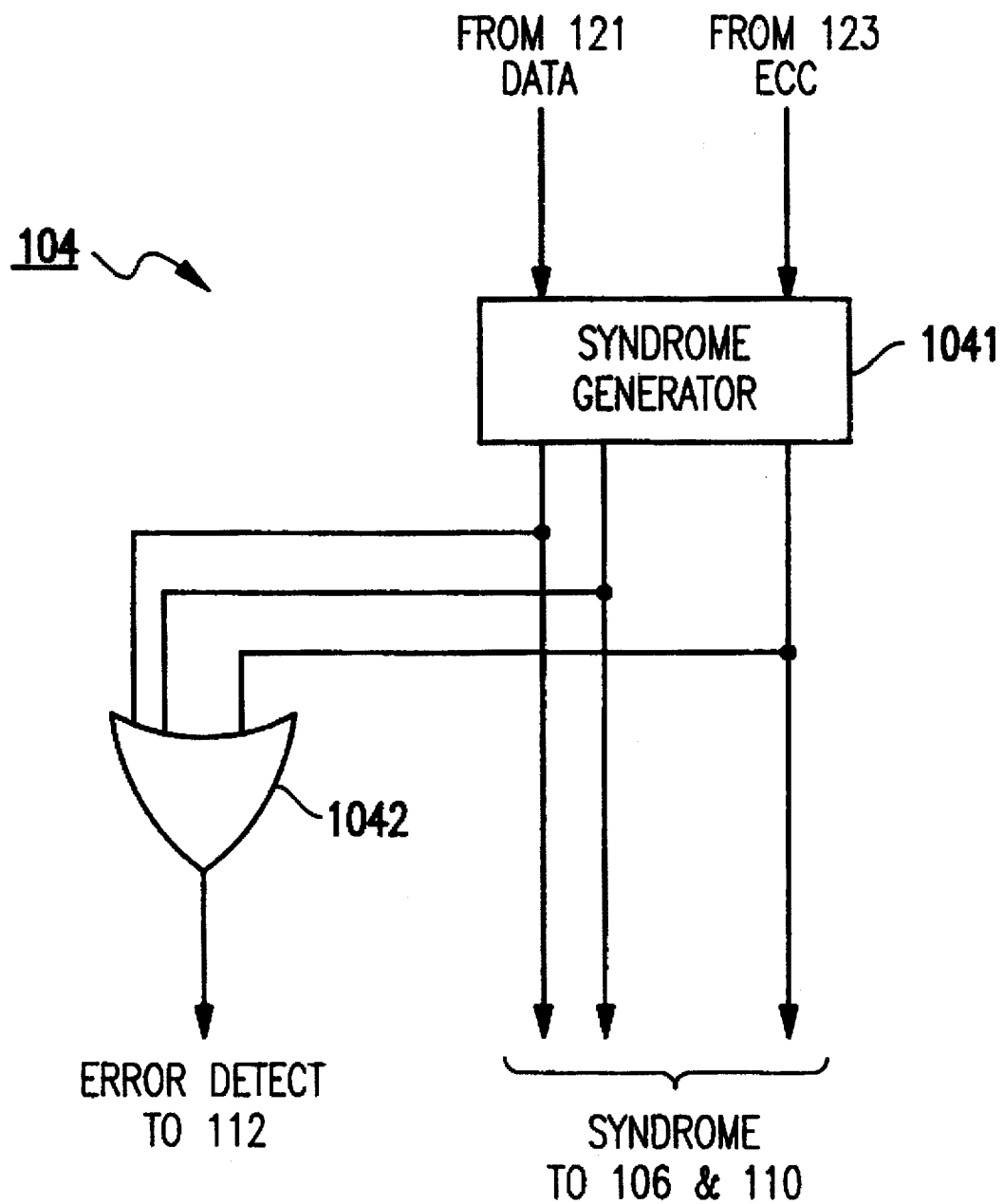
FIG. 9 is a block diagram showing the configuration of an error detector 104 according to the preferred embodiment of the present invention.

Since each of the error detectors 104, 105, 154, and 155 has the same circuit arrangement, the detailed circuit arrangement of the error detector 104 will now be described with reference to FIG. 9. The error detector 104 has a syndrome generator 1041 and an OR gate 1042. The syndrome generator 1041 generates the syndrome according to FIG. 4. The OR gate 1042 detects an error based on the syndrome according to FIG. 5.

In this example, the syndrome is generated in both the corrector 102 and the error detector 104. However, a syndrome generator is preferably shared by the corrector 102 and the error detector 104.

An example of the syndrome of the check suppressing patterns used in the present invention is illustrated in FIG. 4. Although such a pattern "1111111" of the bits (0) to (6) of the syndrome is defined as the check suppressing pattern in this embodiment, these syndrome bits may be set to arbitrary values according to the designer's requirements.

Referring to FIG. 5, a syndrome judgment diagram for the 1-bit error correction and the 2-bit error detection code diagram of FIG. 4 is shown. According to the syndrome judgment diagram of FIG. 5, since the error is discriminable based on such a number that the syndrome bit values (0) to (6) become "1", the above-described pattern has been employed as the most suitable pattern in order to explain this embodiment. Also, since the above-mentioned check suppressing pattern is employed, the ECC converters 108, 109, 158, and 159 and the comparators 110, 111, 160, and 161 can be realized by a simple configuration.

Since each of the ECC converters 108, 109, 158, and 159 has the same circuit arrangement, the circuit arrangement of the ECC converter 108 will now be described with reference to FIG. 10. The ECC converter 108 converts the ECC such that the syndrome of ECC and data becomes the check suppressing pattern when the syndrome is detected as the uncorrectable pattern.

Figure 10:
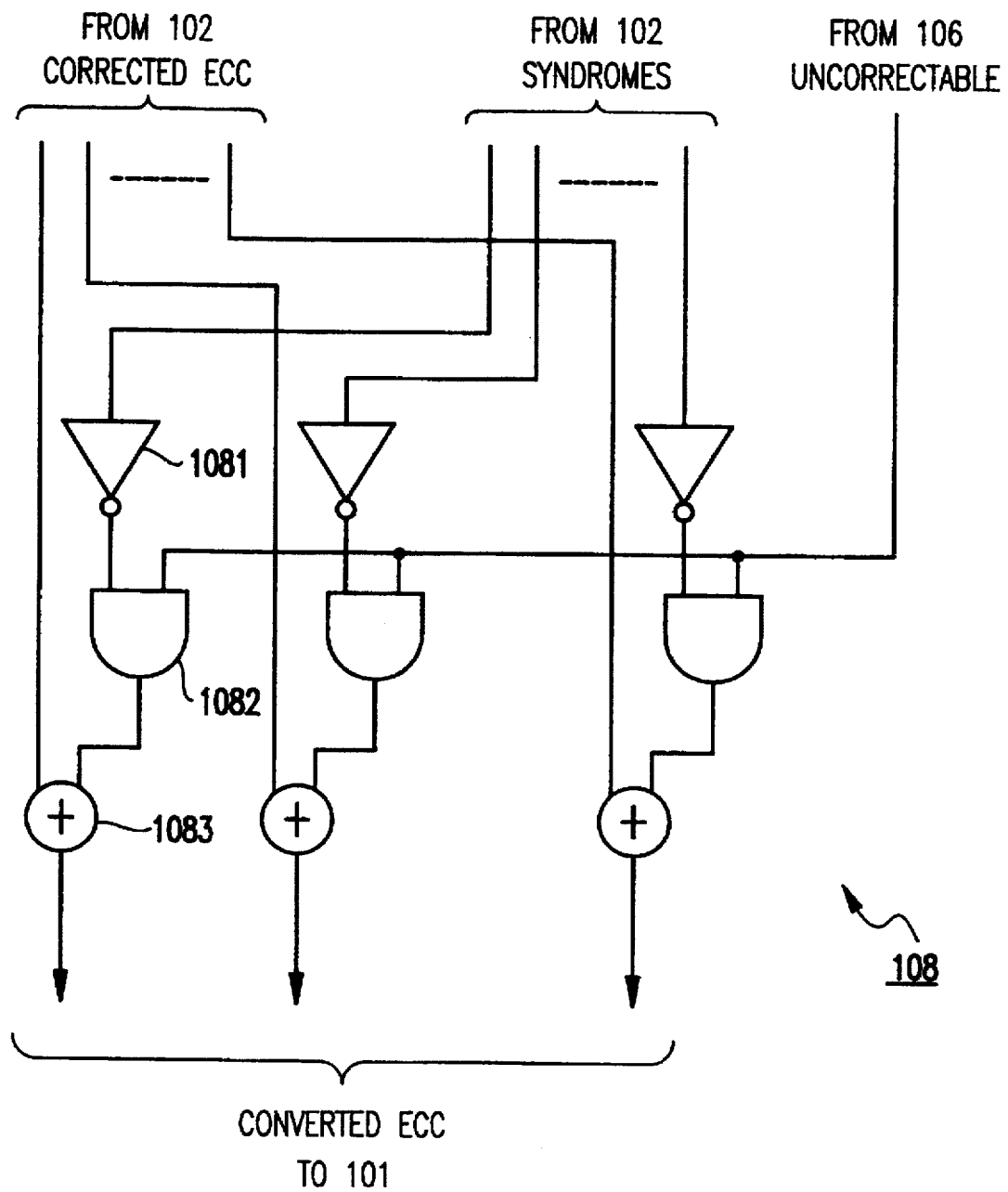
FIG. 10 is a block diagram showing the configuration of an ECC converter 108 according to the preferred embodiment of the present invention.

As indicated in FIG. 10, inputs to the ECC converter 108 are the values of the corrected ECC (0) to (6) outputted from the corrector 102, the values of the syndromes (0) to (6) outputted from the corrector 102, and the uncorrectable pattern detection signal outputted from the comparator 106. Outputs from the ECC converter 108 are the converted ECC (0) to (6) which are supplied to the RAM 101. As the corrected values of the ECC (0) to (6) outputted from the corrector 102, in the case of the correctable error, the corrected values are outputted. However, in other cases, the uncorrected values are directly outputted.

Since the check suppressing pattern is defined as all of the syndromes (0) to (6) being "1", a bit such that the value of the syndrome is "0" should be converted when the syndrome is coincident with the uncorrectable pattern. Consequently, a condition in which a value of the syndrome of "0" is detected by an inverter 1081, and further is AND-gated with the detection of the uncorrectable pattern by an AND gate 1082, so that a condition for converting the value of the ECC is generated. An exclusive OR-gating operation is carried out between the output from the AND gate 1082 and the corrected ECC value by an XOR gate 1083, so that the ECC value of the subject bit is inverted.

The comparators 110, 111, 160, and 161 for judging whether the syndrome is coincident with the check suppressing pattern may have typical comparator configurations as known by one of ordinary skill in the art. Since the check suppressing pattern is defined as all "1"s in this example, the comparators 110, 111, 160, and 161 are simplified as shown in FIG. 11.

Figure 11:
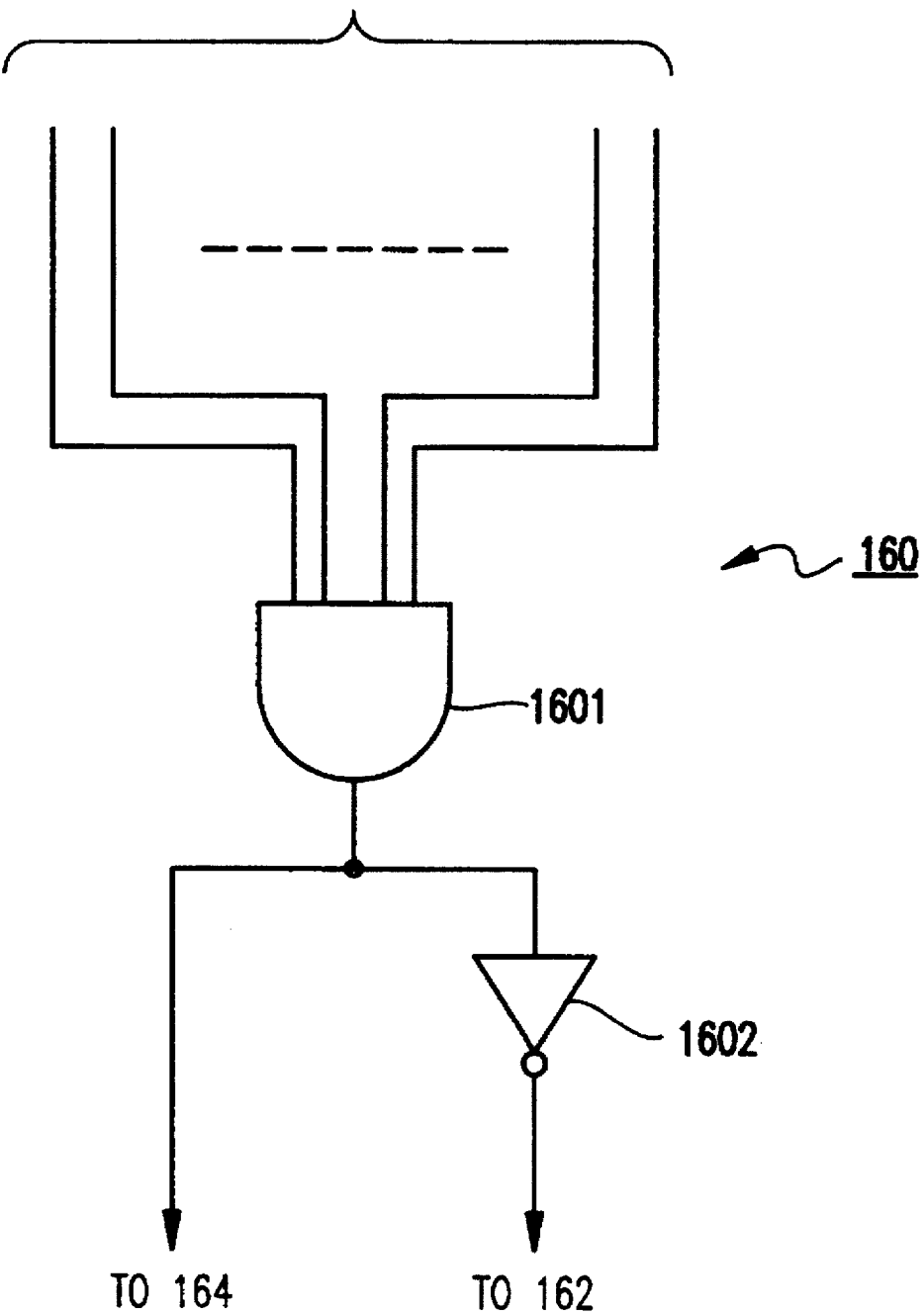
FIG. 11 is a block diagram showing the configuration of a comparator 160 according to the preferred embodiment of the present invention.

Referring to FIG. 11, a comparator 160 detects when the syndrome is other than the check suppressing pattern, and outputs the comparison result to the AND gate 162 of the fault notification configuration. Inputs to the comparator 160 are the syndromes (0) to (6) derived from the error detector 154 (e.g., shown in FIG. 7). The syndromes (0) to (6) are AND-gated by an AND gate 1601 so as to detect whether the syndrome is the check suppressing pattern.

Furthermore, an inverter 1602 detects whether the syndrome is other than the check suppressing pattern. This result is outputted to the AND gate 162 of the fault notification configuration shown in FIG. 7, and the AND gate 162 AND-gates this result with the output from the error detector 154, and provides fault notification only in cases other than the check suppressing pattern.

Hereinbelow, the operation of the data fault processing apparatus in accordance with the above-mentioned embodiment of the present invention will be described with reference to FIGS. 1 and 4–11.

First, the memory read request issued by the processor 20 is processed in the cache memory 15 to access the RAM 151, as shown in FIG. 7. When the subject read data is present in the RAM 151, both of the data and ECC read out from the RAM 151 are processed by the corrector 153 and the error detector 155. When an error is not detected or a correctable error is detected, the corrector 153 corrects the data, outputs the data having the correct value and sends this correct data to the requesting processor 20.

When there is no subject read data in the RAM 151 of the cache memory of FIG. 7, a read operation of the main memory 20 is carried out. In this case, both the read data and the ECC to be processed are read out from the RAM 101, as shown in FIG. 6. If an uncorrectable error occurs, both the data and the ECC read from the RAM 101 are processed in the corrector 103 and the error detector 105. Since an uncorrectable error occurs, there is no coincidence between the syndrome generated by the corrector 103 from the data and the ECC, and the correctable pattern indicated in FIG. 4.

Accordingly, the corrector 103 directly outputs the inputted values to buffer 122 and ECC converter 109 without correcting the data and the ECC. The error detector 105 generates the syndrome from the data and the ECC, and then detects the error because all of the values of syndromes (0) to (6) are not "0". Since the uncorrectable error is generated, the bit numbers when the values of syndromes (0) to (6) become "1" correspond to any one of 2, 4, and 6. The error detector 105 outputs the error detection signal to the AND gate 113 for the fault notification, and the syndromes (0) to (6) are outputted to the comparator 107 for detecting a pattern other than the check suppressing pattern. The comparator 107 also receives the error detection signal for comparison with the uncorrectable pattern.

The comparator 111 for detecting the pattern other than the check suppressing pattern will now be explained with reference to the comparator 160 of FIG. 11. Comparator 111 has the same arrangement as the comparator 160 of FIG. 11.

That is, the comparator 111 has an AND gate 1111 like the AND gate 1601 and an inverter 1112 like the inverter 1602. The comparator 111 for detecting the pattern other than the check suppressing pattern detects for a pattern in which the values of the syndromes (0) to (6) are not all "1" according to FIG. 5. Since the detected pattern corresponds to the uncorrectable pattern, all of the values of the syndromes (0) to (6) are not equal to "1", so that the output from the AND gate 1111 becomes "0". This output in turn is inverted by the inverter 1112, and thus the AND gate 1111 outputs "1".

Consequently, when the syndrome is a pattern other than the check suppressing pattern, the comparator 111 outputs "1" to the fault notifying AND gate 113 of FIG. 6. The fault notifying AND gate 113 logically ANDs the error detection signal outputted from the error detector 105 with the signal outputted from the comparator 111 for detecting the pattern other than the check suppressing pattern, and then provides fault notification.

Therefore, when the uncorrectable error occurs, since both the output from the error detector 105 and the output from the comparator 111 become "1", the output from the AND gate 113 becomes "1" and provides fault notification.

In accordance with FIG. 5, the comparator 107 for the uncorrectable pattern detects that the number of such bits that the values of the syndromes (0) to (6) outputted by the error detector 105 become "1" is 2, 4, or 6. Accordingly, when the uncorrectable error occurs, the comparator 107 outputs "1" to the ECC converter 109.

The ECC converter 109 will now be explained with reference to the ECC converter 108 of FIG. 10, the ECC converter 109 having the same arrangement as that of the ECC converter 108 of FIG. 10. That is, the ECC converter 109 has inverters 1091 like the inverters 1081, AND gates 1092 like the AND gates 1082, and exclusive-OR gates 1093 like the exclusive-OR gates 1083.

The ECC converter 109 converts, the ECC such that the syndrome becomes the check suppressing pattern when the detection of the uncorrectable pattern entered from the comparator 107 is "1". As a result, when the uncorrected error occurs, the value of ECC of the bit in which the value of the syndrome outputted by the corrector 103 is "0" is inverted to be outputted.

With the above-described process, both the data outputted from the corrector 103 and the ECC outputted from the ECC converter 109 are outputted from the main memory 10 to the system buses 31 and 32, respectively.

The cache memory 15 receives the data and the ECC from the system buses 31 and 32, which are processed by the corrector 152 and the error detector 154. Since the ECC has been converted by the ECC converter 109 before being outputted to the system bus 32 for ECC, the syndrome generated by the corrector 152 becomes the check suppressing pattern having all "1"s. Consequently, the corrector 152 outputs the data and the ECC without any error correction.

Since all of the syndromes are not equal to "0" as shown in FIG. 5, the error detector 154 detects the error and outputs "1" to the fault notifying AND gate 162. Also, the error detector 154 outputs the syndromes to the comparator 160 for detecting a pattern other than the check suppressing pattern and the comparator 156 for comparison with the uncorrectable pattern.

The comparator 160 will now be explained with reference to FIG. 11. Since all of the syndromes outputted from the error detector 154 are "1", the output from the AND gate 1601 becomes "1" which in turn is inverted into "0" by the inverter 1602. As a result, the comparator 160 for detecting the pattern other than the check suppressing pattern outputs "0" to the fault notifying AND gate 162, and outputs "1" to the error replier 164.

Consequently, the fault notifying AND gate 162 does not perform the fault notification because the input from the comparator 160 is "0" and the output value becomes "0". The comparator 156 for the uncorrected pattern outputs the value "0" to the ECC converter 158 and the error replier 164, since all of the syndromes produced from the error detector 154 are "1". The error replier 164 notifies the requesting processor 20 of the error by OR-gating both the value outputted from the comparator 160 when the syndromes are coincident with the check suppressing pattern, and the value outputted from the comparator 156 when the uncorrectable pattern is produced.

With the above-described process, the error replier 164 provides error notification at the same time when the data outputted by the error detector 152 is outputted to the requesting processor 20. Since the comparator 156 for the uncorrectable pattern outputs "0", the ECC converter 158 does not execute the ECC conversion. Hence, both the data and the ECC having the check suppressing pattern in which all of the syndromes become "1" are directly stored into the RAM 151.

Similar to when the access to the data, which becomes the syndrome of the check suppressing pattern stored in the RAM 151, is issued from another processor 20, the comparator 161 for the check suppressing pattern outputs "0" to the fault notifying AND gate 163, and also outputs "1" to the error replier 165. As a result, as illustrated in FIG. 5, when the syndrome is the check suppressing pattern, no fault is notified and only an error is notified to the requesting processor 20. Also, since the data and the ECC are outputted with the values thereof maintained, the state can be reserved.

Furthermore, even in such a store-in cache system that the content of the cache is written back into the main memory, or extended into another cache, once the ECC is converted such that the syndrome becomes the check suppressing pattern, all of the fault notifications can be suppressed when all of the system caches are read, both the data and the ECC of the system buses are received, and the content of the memory is re-read after writing-back.

Moreover, a system is provided such that the error can be reliably and affirmatively notified to the requesting processor. Consequently, the fault is notified only from the location where the fault occurs first, and thus the fault location can be quickly and accurately pin-pointed.

With regard to such data that the ECC has been converted so as to become the check suppressing pattern, the data condition can be simply returned to the normal condition by performing the fault process, or by re-executing the job and the process to write the new data over this data.

Even when a 1-bit fault further occurs, as shown in FIG. 5, this 1-bit fault may be similarly handled as a 2-bit error where the number of "1"s is equal to 6 by setting all of the check suppressing patterns to "1". Accordingly, a system having high reliability and for sustaining the fault is provided.

As is apparent from the above description, according to the present invention, when the uncorrectable data error occurs, the fault is notified only from a location where the fault first occurred. Thus, the fault is prevented from being notified from a location other than the location where the fault is first detected. Moreover, the fault notifications from a plurality of other locations are suppressed. Consequently, the fault process can be simplified and further, the occurrence of the fault can be readily specified and identified.

Moreover, according to the present invention, since the occurrence of the error can be affirmatively notified to the requesting processor without requiring complex hardware, the data can be sufficiently guaranteed when the fault occurs. The advantages of the present invention described above and others may be achieved in the multi-processor system, since the present invention can be realized even where such a processor for accessing the uncorrectable data is located.

Furthermore, the present invention is relevant and advantageous to not only a store-through cache but also a store-in cache.

While the invention has been described in terms of a preferred embodiment, those skilled in the art will recognize that the invention can be practiced with modification within the spirit and scope of the appended claims.

What is claimed is:

1. A data fault processing apparatus, comprising:
   a converter for converting an error correction code, wherein when a first syndrome, generated from a data and said error correction code, includes a predetermined pattern, said converter converts the error correction code so that a second syndrome generated from the data and a converted error correction code, becomes a check suppressing pattern; and
   a fault notifier for notifying a processor of a fault when an error is detected and the second syndrome includes a pattern other than the check suppressing pattern.

2. The data fault processing apparatus according to claim 1, further comprising a comparator for detecting a coincidence between the second syndrome and the check suppressing pattern for said fault notifier.

3. The data fault processing apparatus according to claim 1, wherein said fault notifier notifies said processor of said fault only when the second syndrome includes a pattern other than the check suppressing pattern.

4. The data fault processing apparatus according to claim 1, further comprising a comparator for detecting a coincidence between the first syndrome and said predetermined pattern for said converter,
   wherein said predetermined pattern comprises an uncorrectable pattern.

5. The data fault processing apparatus according to claim 4, further comprising a second comparator for detecting a coincidence between the second syndrome and the check suppressing pattern for said fault notifier.

6. A storage unit having a memory array for storing an input data and an input error correction code, and for outputting an output data and an output error correction code, said storage unit comprising:
   a corrector connected to said memory array, for correcting the input data and the input error correction code;
   a converter for converting a corrected input error correction code, wherein when a first syndrome, generated from the input data and the input error correction code, includes a predetermined pattern, said converter converts the corrected input error correction code so that a second syndrome, generated from the corrected input data and a converted input error correction code, becomes a check suppressing pattern;

an error detector for detecting an error from the output data and the output error correction code; and a fault notifier for notifying a processor of a fault when said error detector detects said error and a third syndrome, generated from the output data and the output error correction code, includes a pattern other than the check suppressing pattern.

7. The storage unit according to claim 6, further comprising:

a first comparator for detecting a coincidence between the first syndrome and the predetermined pattern for said converter, wherein said predetermined pattern comprises an uncorrectable pattern; and a second comparator for detecting a coincidence between the third syndrome and the check suppressing pattern for said fault notifier.

8. The storage unit according to claim 6, connected in a multi-processor system and comprising a main memory.

9. The storage unit according to claim 6, connected in a multi-processor system and comprising a cache memory.

10. The storage unit according to claim 6, wherein said fault notifier notifies said processor of said fault only when the third syndrome includes a pattern other than the check suppressing pattern.

11. The storage unit according to claim 6, further comprising:

a second corrector connected to said memory array, for correcting the output data and the output error correction code; and a second converter for converting, when the third syndrome includes the predetermined pattern, the corrected output error correction code, such that a fourth syndrome, generated from the corrected output data and a converted output error correction code, becomes a check suppressing pattern.

12. The storage unit according to claim 11, further comprising:

a first comparator for detecting a coincidence between the first syndrome and the uncorrectable pattern for said converter;

a second comparator for detecting a coincidence between the third syndrome and the check suppressing pattern for said fault notifier; and a third comparator for detecting a coincidence between the third syndrome and the uncorrectable pattern for said second converter.

13. The storage unit according to claim 6, further comprising:

a second error detector for detecting an error from the input data and the input error correction code; and a second fault notifier for notifying a fault to the processor when said second error detector detects the error and the first syndrome has a pattern other than the check suppressing pattern converted by said converter.

14. The storage unit according to claim 13, further comprising:

a first comparator for detecting a coincidence between the first syndrome and said predetermined pattern for said converter, wherein said predetermined pattern comprises an uncorrectable pattern;

a second comparator for detecting a coincidence between the third syndrome and the check suppressing pattern for said fault notifier; and a third comparator for detecting a coincidence between the first syndrome and the check suppressing pattern for said second fault notifier.

15. The storage unit according to claim 13, wherein said second fault notifier notifies said processor of said fault only when the first syndrome includes a pattern other than the check suppressing pattern.

16. The storage unit according to claim 13, further comprising:

a second corrector connected to said memory array, for correcting the output data and the output error correction code; and a second converter for converting, when the third syndrome includes the predetermined pattern, the corrected output error correction code, such that a fourth syndrome, generated from the corrected output data and a converted output error correction code, becomes a check suppressing pattern.

17. The storage unit according to claim 16, further comprising:

a first comparator for detecting a coincidence between the first syndrome and the uncorrectable pattern for said converter;

a second comparator for detecting a coincidence between the third syndrome and the check suppressing pattern for said fault notifier;

a third comparator for detecting a coincidence between the third syndrome and the uncorrectable pattern for said second converter; and a fourth comparator for detecting a coincidence between the first syndrome and the check suppressing pattern for said second fault notifier.

18. The storage unit according to claim 16, connected in a multi-processor system and comprising a main memory.

19. The storage unit according to claim 16, connected in a multi-processor system and comprising a cache memory.

20. A multi-processor system having a storage unit, said storage unit comprising:

a memory array for storing an input data and an input error correction code, and for outputting an output data and an output error correction code;

a corrector connected to said memory array, for correcting the input data and the input error correction code;

a converter for converting a corrected input error correction code, wherein when a first syndrome, generated from the input data and the input error correction code, includes a predetermined pattern, said converter converts the corrected input error correction code so that a second syndrome, generated from the corrected input data and a converted input error correction code, becomes a check suppressing pattern;

an error detector for detecting an error from the output data and the output error correction code; and a fault notifier for notifying a processor of a fault when said error detector detects said error, and the second syndrome includes a pattern other than the check suppressing pattern.

21. The multiprocessor system according to claim 20, wherein said fault notifier notifies said processor of said fault only when the second syndrome includes a pattern other than the check suppressing pattern.

22. A method of processing a data fault, said method comprising steps of:

converting, when a first syndrome, generated from a data and an error correction code, includes a predetermined pattern, the error correction code so that a second syndrome, generated from the data and a converted error correction code therein, becomes a check suppressing pattern;

outputting the data and the error correction code to produce an output data and an output error correction code; and notifying a processor of a fault if an error is detected, based on said second syndrome, unless a third syndrome, generated from the output data and the output error correction code, includes the check suppressing pattern.

23. The method of processing the data fault as claimed in claim 22, wherein said predetermined pattern comprises an uncorrectable pattern, said outputting step further including steps of:

writing the data and the error correction code to a memory array; and reading the data and the error correction code from the memory array as the output data and the output error correction code.

24. The method of processing the data fault as claimed in claim 22, wherein said predetermined pattern comprises an uncorrectable pattern, said outputting step further including a step of:

transferring, via a bus, the data and the error correction code to form the output data and the output error correction code.

25. The method of processing the data fault as claimed in claim 22, wherein said predetermined pattern comprises an uncorrectable pattern, further including steps of:

judging whether said first syndrome has said predetermined pattern; and detecting whether said error exists based on said second syndrome.

* * * * *